(No Model.)   5 Sheets—Sheet 1.

W. H. PAINE.
GRIPPING AND BRAKE MECHANISM FOR CABLE RAILWAYS.

No. 296,604.   Patented Apr. 8, 1884.

Attest:
Geo. T. Smallwood.
Harry E. Knight.

Inventor
William H. Paine.
By Knight Bros.
attys.

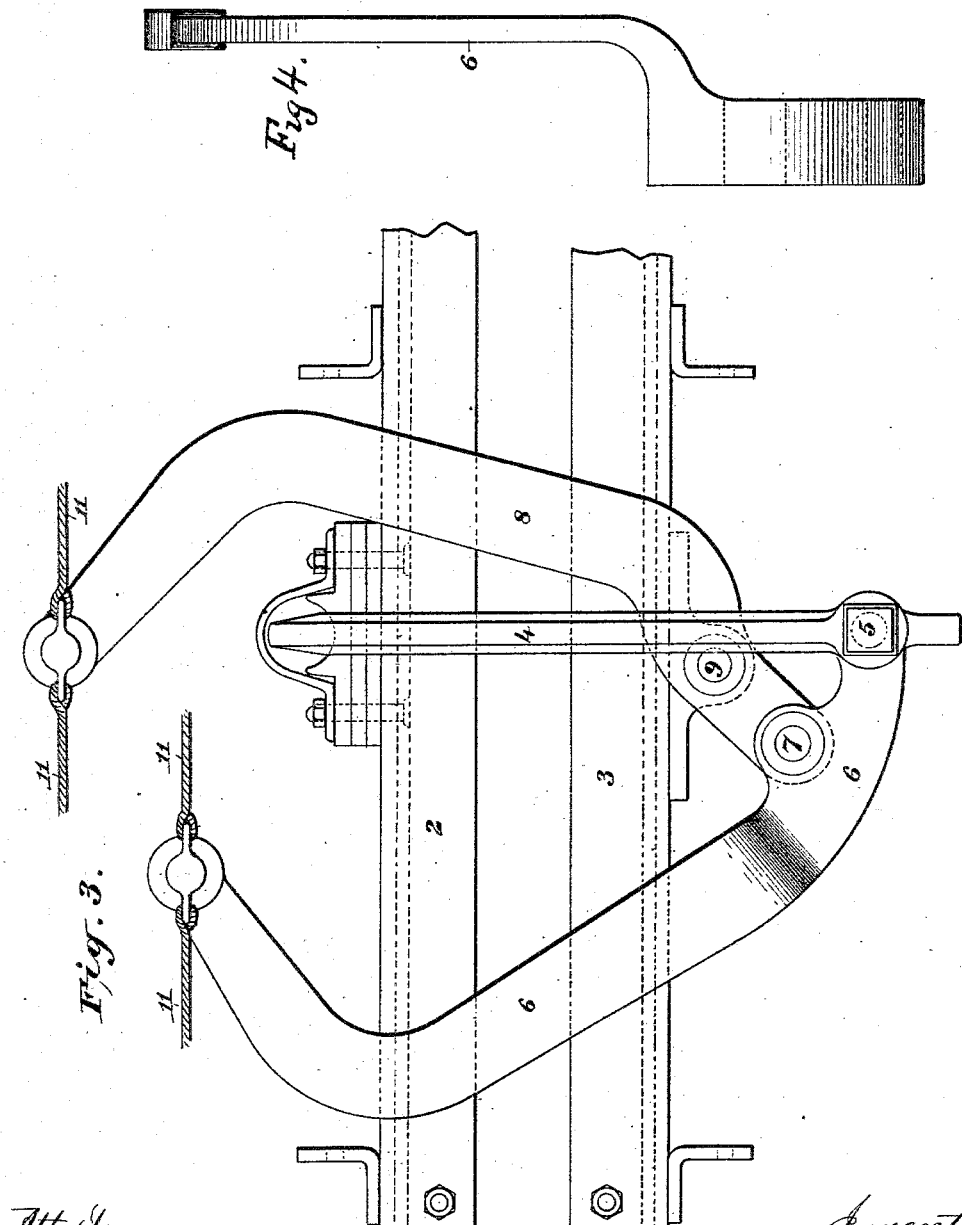

(No Model.)  5 Sheets—Sheet 3.

W. H. PAINE.
GRIPPING AND BRAKE MECHANISM FOR CABLE RAILWAYS.

No. 296,604. Patented Apr. 8, 1884.

Attest:
Geo. T. Smallwood.
Harry E. Knight.

Inventor:
William H. Paine
By Knight Bros
attys.

(No Model.)  5 Sheets—Sheet 4.

W. H. PAINE.
GRIPPING AND BRAKE MECHANISM FOR CABLE RAILWAYS.

No. 296,604.  Patented Apr. 8, 1884.

(No Model.)  5 Sheets—Sheet 5.

W. H. PAINE.
GRIPPING AND BRAKE MECHANISM FOR CABLE RAILWAYS.

No. 296,604.  Patented Apr. 8, 1884.

Attest:
Geo. T. Smallwood,
Harry R. Knight

Inventor:
William H. Paine
By Knight Bros.
Attys.

UNITED STATES PATENT OFFICE.

WILLIAM H. PAINE, OF BROOKLYN, NEW YORK.

GRIPPING AND BRAKE MECHANISM FOR CABLE RAILWAYS.

SPECIFICATION forming part of Letters Patent No. 296,604, dated April 8, 1884.

Application filed August 31, 1883. (No model.)

*To all whom it may concern:*

Be it known that I, WILLIAM HENRY PAINE, a citizen of the United States, residing at Brooklyn, in the State of New York, have invented certain new and useful Improvements in Gripping and Brake Mechanism for Cable Railways, of which the following is a specification.

My grip mechanism is located at the center of the car, and operated from a hand wheel and shaft at either end through the medium of an endless rope or chain connected with grip-levers. The endless rope or chain passes at each end of the car around a drum, which is driven by a pinion on the hand-shaft, and this shaft is adjustable vertically, so that after releasing the grip it may by a downward movement engage with a clutch-pulley on which an ordinary brake-chain is coiled. A suitable indicator may be employed to show the connection of the shaft with the grip and brake mechanism, respectively, or its disconnection from both. The cable is gripped by means of a pair of levers fulcrumed and connected in such a manner that the first movement of the said levers applies a direct pull to draw the gripping-jaws in contact with the rope by a quick movement, after which the cable is gripped by a more forcible movement.

Figure 1:
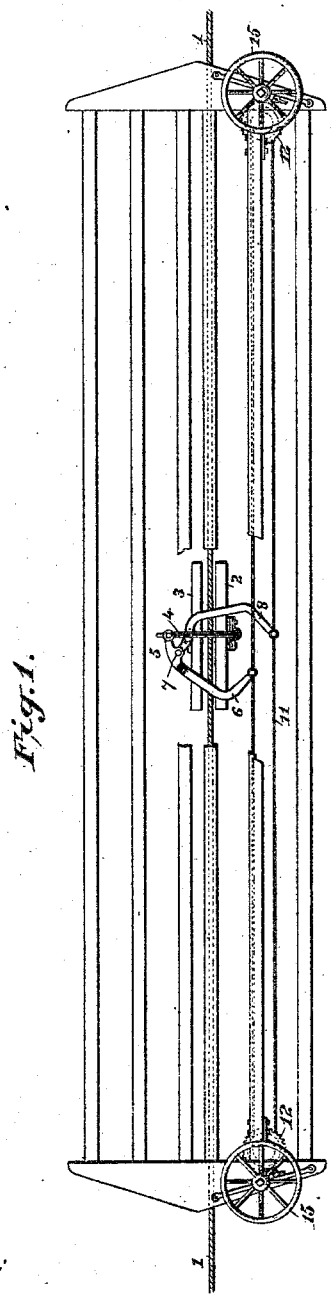
Figure 2:
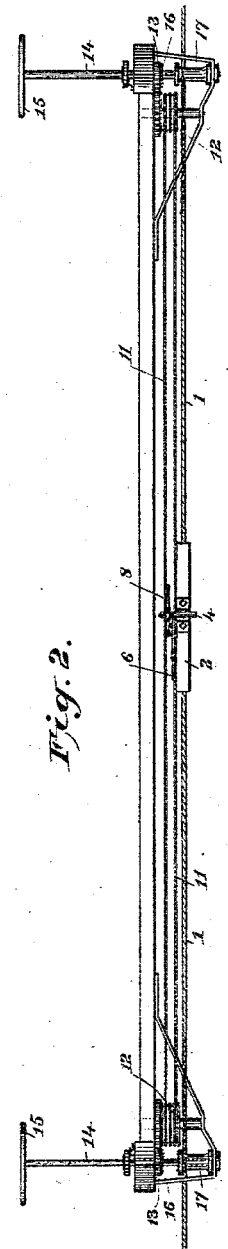
Figure 7:
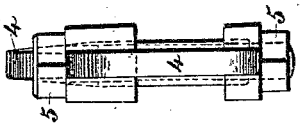
Figure 6:
Figure 5:
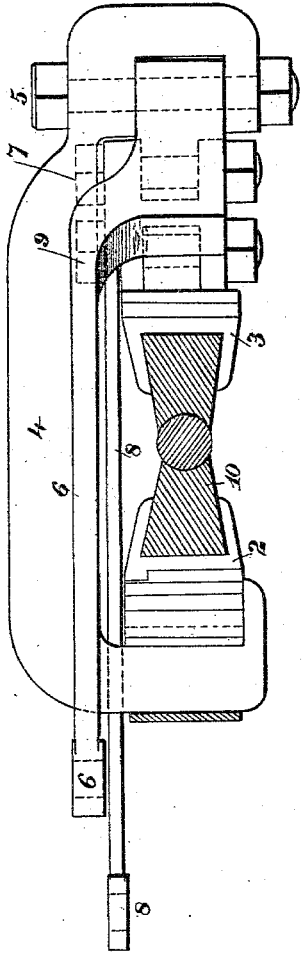
Figure 8:
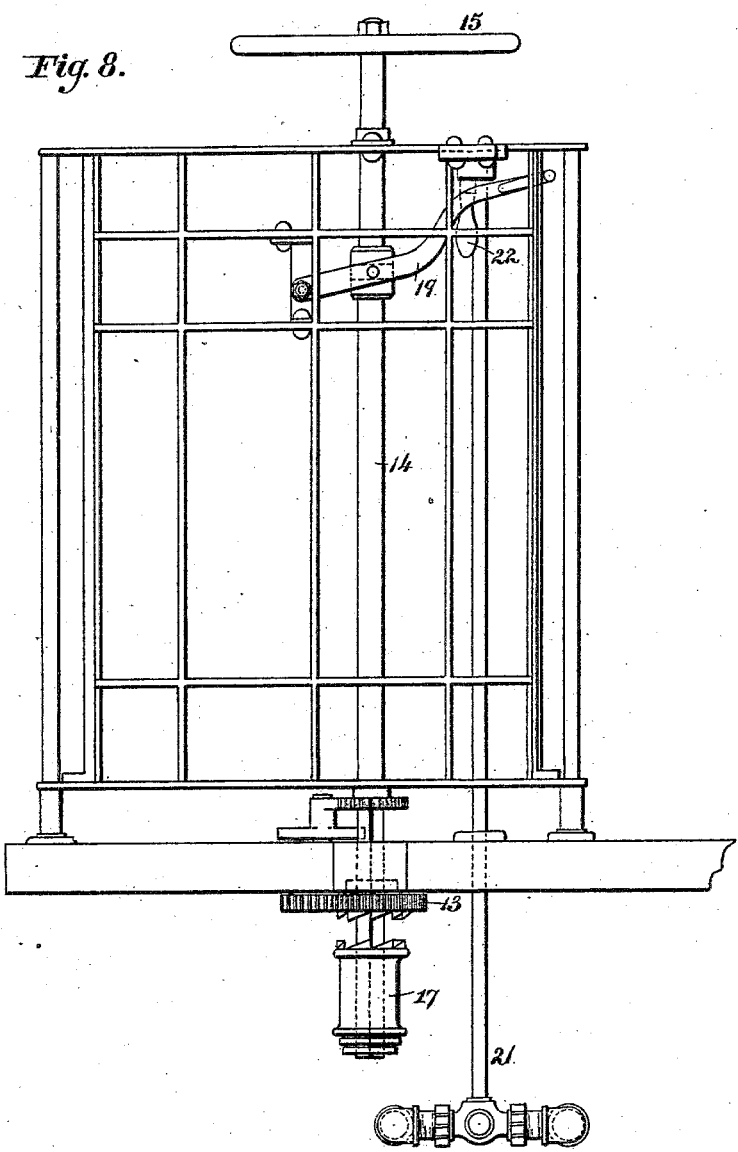
Figure 9:
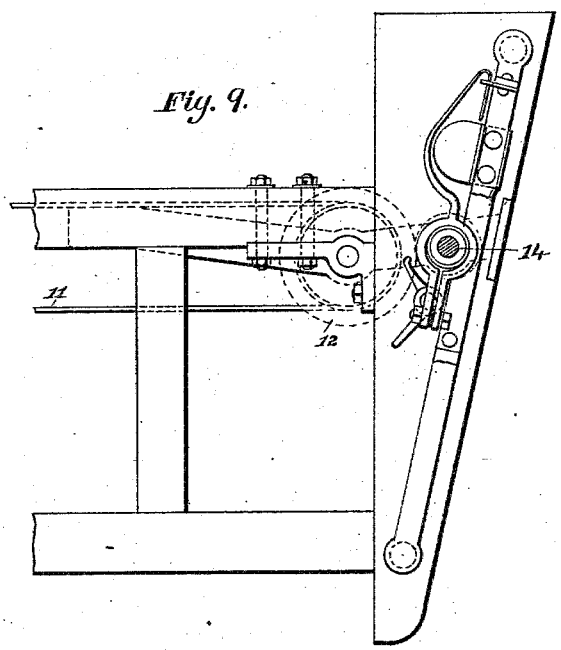
Figure 10:
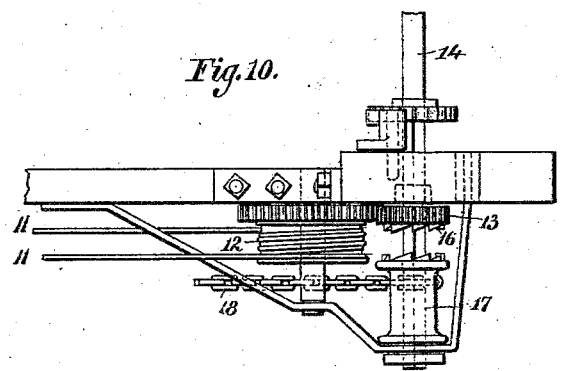

In the accompanying drawings, Figure 1 is a plan view of the gripping mechanism and cable, the car-body being indicated in the outline. Fig. 2 is a side elevation of the same. Fig. 3 is a plan view, on a larger scale, of the gripping mechanism. Fig. 4 is an elevation of one of the bent levers detached. Fig. 5 is an end view of the gripping mechanism, showing the grip-shoes and cable in transverse section. Fig. 6 is a plan of the holding link or strap. Fig. 7 is a view of the end thereof. Fig. 8 is an end view of the operating mechanism. Fig. 9 is a plan of the same. Fig. 10 is a side view thereof.

1 represents the main rope or cable of the railway. 2 3 are gripping-jaws suspended from the bottom of the car, and connected by a link, 4, fixed at one end to the jaw 2, and pivoted at the other end at 5 to the extremity of the bent lever 6. The lever 6 is fulcrumed at 7 to the lower extremity of a similar bent lever, 8, and fulcrumed at 9 to the second jaw, 3. This construction is such that in the first movement of the bent levers 6 8 on their fulcrums the jaws 3 and 2 will be quickly brought into contact with the cable. After the shorter end of the bent lever 6 has passed beyond a position at right angles to the shorter end of the lever 8, and approaches a position nearly in line therewith, it imparts a very forcible compressive movement to the jaws.

The construction and operation of the levers are more fully illustrated in the detailed views, Figs. 3, 4, 5, 6, and 7. The jaws 2 3 are made in the form of brake-shoes, for receiving blocks or rubbers 10, which are preferably made of wood, with the end of the fiber presented outward toward the rope or cable. This double-lever movement is also applicable to the operation of roller-grips, details of which I have described in another application of even date herewith.

The movements of the levers 6 8 are effected by an endless wire rope or chain, 11, the two parts of which are connected to the extremities of the respective levers, and which passes around toothed drums 12 at the ends of the car. Each of these drums is driven by a pinion, 13, on a vertical shaft, 14, furnished with a hand-wheel, 15. By this means the grip may be operated at will from either end of the car. The movement of the endless rope in one direction draws the ends of the levers toward or past one another to close the grip, and its movement in the other direction draws them apart to open the grip. The gripping-jaws or their levers may be provided with springs of any usual form, to retract them when the hand-shaft is disconnected therefrom. The shaft 14 is adjustable vertically, so that by a downward movement its pinion may be disengaged from the toothed drum 12, thus retracting the gripping-jaws and freeing the cable. The shaft is further provided with a clutch-disk, 16, having corrugations or teeth to engage with similar teeth on the top of a drum or cylinder, 17, which otherwise runs loosely on the shaft, but is by this means revolved. The said drum 17 operates a brake-chain, 18, which is wound thereon, and connected with brake-levers in any customary manner. (See Fig. 10.) The brakes are applied simultaneously by the operation of the hand-shaft at either end through the medium of the usual connections, or, when the hand-shaft is in its intermediate position, by an ordinary air-brake. The vertical adjustment of the shaft 14, to place it in gear with the grip mechanism or brake mechanism at will, may be effected by a lever, 19, engaging with a notched plate on the frame of the car, or held by a catch operated by the foot or in any suitable manner. When the shaft is raised to the highest point, it will be in gear with the grip mechanism, or when it is placed at the lowest point it will be in gear with the brake mechanism, and when placed in an intermediate position it will be out of gear with either, so as to leave both free.

The cars may be provided with air or vacuum brakes in addition to or instead of the hand-brakes. In this case the cock 21 of the air or vacuum brake is governed by a jointed handle, 22, which is held in an inoperative position by the lever 19 when the latter is raised, so that the brakes cannot be applied while the grip is "on."

Having thus described my invention, the following is what I claim as new therein and desire to secure by Letters Patent:

1. A gripping device for cable railways, consisting of double levers and suitable jaws mounted thereon, said levers being fulcrumed one on the other, and operating, substantially as herein described, so as to bring the jaws in contact with the rope by a quick movement and grip it by a more forcible movement.

2. A grip for cable-railway cars, operated by double levers through the medium of an endless chain or rope traveling in opposite directions, as set forth.

3. A grip for cable-railway cars, operated by double levers fulcrumed one on the other and coacting on the gripping-jaws, substantially as and for the purpose set forth.

4. A grip for cable-railway cars, operated by double levers through the medium of an endless rope or chain passing over drums at either end of the car, said drums deriving rotation from the hand-brake windlass, as set forth.

5. The combination, with the grip mechanism and the brake mechanism, of a hand-shaft movable vertically, so as to engage with either, substantially as described.

6. The combination of a grip mechanism, a brake mechanism, and a vertically-moving shaft having a lever for adjusting it, as and for the purpose set forth.

WILLIAM H. PAINE.

Witnesses:
  OCTAVIUS KNIGHT,
  GEO. O. SACKETT.